(12) United States Patent
Shooshtari et al.

(10) Patent No.: US 9,340,454 B2
(45) Date of Patent: May 17, 2016

(54) METHODS FOR MAKING REINFORCED THERMOSET COMPOSITES WITH SIZED FIBERS

(75) Inventors: Kiarash Alavi Shooshtari, Littleton, CO (US); Jawed Asrar, Englewood, CO (US); Rajappa Tadepalli, Highlands Ranch, CO (US); Klaus Friedrich Gleich, Highlands Ranch, CO (US)

(73) Assignee: Johns Manville, Denver, CO (US)

( * ) Notice: Subject to any disclaimer, the term of this patent is extended or adjusted under 35 U.S.C. 154(b) by 363 days.

(21) Appl. No.: 13/335,793

(22) Filed: Dec. 22, 2011

(65) Prior Publication Data

US 2013/0161859 A1 Jun. 27, 2013

(51) Int. Cl.
*C03C 25/26* (2006.01)
*B29B 15/10* (2006.01)
*C03C 25/38* (2006.01)
*C08F 292/00* (2006.01)

(52) U.S. Cl.
CPC .............. *C03C 25/26* (2013.01); *B29B 15/10* (2013.01); *C03C 25/38* (2013.01); *C08F 292/00* (2013.01)

(58) Field of Classification Search
None
See application file for complete search history.

(56) References Cited

U.S. PATENT DOCUMENTS

| 4,404,717 | A | * | 9/1983 | Neubauer et al. ............... 28/107 |
| 5,240,974 | A | | 8/1993 | Lechner et al. |
| 5,549,969 | A | * | 8/1996 | Parish ......................... 428/301.4 |
| 5,773,146 | A | * | 6/1998 | Lawton et al. ................ 428/392 |
| 7,691,919 | B2 | * | 4/2010 | Smolak et al. ................ 523/115 |
| 7,786,225 | B2 | * | 8/2010 | Yasumura et al. ............ 525/530 |
| 2003/0219580 | A1 | | 11/2003 | Tagge et al. |
| 2008/0160281 | A1 | | 7/2008 | Vickery et al. |
| 2009/0181252 | A1 | * | 7/2009 | Shooshtari et al. .......... 428/375 |
| 2010/0280239 | A1 | | 11/2010 | Shooshtari |
| 2010/0305269 | A1 | | 12/2010 | Gleich et al. |

* cited by examiner

*Primary Examiner* — Benjamin Schiffman
(74) *Attorney, Agent, or Firm* — Robert D. Touslee (57) ABSTRACT

Methods are described for activating a glass fiber or flake to participate in polymerizing a resin. The methods may include sizing the glass fiber or flake with a sizing composition that includes a solution containing a polymerization initiator, and activating the polymerization initiator by forming a free radical moiety on the polymerization initiator that can initiate the polymerization of the resin. Additional methods of making a glass reinforced composite are described. The methods may include sizing glass fibers or flakes with a sizing composition that includes a solution containing a polymerization initiator, forming a free radical moiety on the polymerization initiator to make activated glass fibers or flakes, and contacting the activated glass fibers or flakes with a polymer resin. The activated glass fibers or flakes initiate the polymerization of the resin around the glass fibers or flakes to form the glass reinforced composite.

19 Claims, 6 Drawing Sheets

METHODS FOR MAKING REINFORCED THERMOSET COMPOSITES WITH SIZED FIBERS

FIELD OF THE INVENTION

Reactive sizing compositions for fibers and flakes are described that allow the fibers and flakes to participate in polymerization reactions with resin compositions to form fiber (and/or flake) reinforced composites. The composites may be used in a variety of applications, including building materials such as reinforced mats, tubing, and part components, among other applications.

BACKGROUND OF THE INVENTION

Conventional forming processes are used to make large and/or structural glass fiber reinforced composite (GFRC) parts. Processes including RIM (Reactive Injection Molding), SRIM (Structural Reactive Injection Molding), RTM (Resin Transfer Molding), VARTM (Vacuum Assisted Resin Transfer Molding), SMC (Sheet Molding Compound), BMC (Bulk Molding Compound), spray-up forming, filament winding and pultrusion, are used to make thermoset GFRC parts.

With the newly proposed challenging CAFE gas mileage standards being introduced, there is a larger than ever need for lighter weight vehicle parts that fiber reinforced composites could satisfy, particularly if the current processes could be improved to be simpler to use and less costly materials. There is also a large need for new materials that would allow these results.

The conventional use of thermosetting resins in the conventional forming processes may include making a first mixture of a first thermosetting resin with a promoter, or catalyst, and near the time of the use of this mixture in these forming processes, adding a polymerization initiator. This mixture starts polymerizing soon after reaching a polymerization temperature. The mixture is normally heated just below a rapid polymerization temperature to maximize the productivity of the forming process, and the molds and/or reinforcing fiber performs, mat, etc., are preheated to polymerization temperatures so the mixture can rapidly polymerize once injected into the mold(s). These procedures require the mixture to be injected into the mold soon after being made, which can contribute significantly to the time and labor costs for making reinforced composites. Thus, there is a need for new materials and processes that can increase the efficiency of making fiber (and/or flake) reinforced composites. This and other challenges are addressed by the present application.

BRIEF SUMMARY OF THE INVENTION

Reactive sizing compositions and methods of sizing fibers and flakes are described that increase the efficiency of making reinforced composites using the sized fiber and flakes. The reactive sizing compositions may include one or more polymerization initiators (PIs) that help initiate the polymerization of a resin that forms the polymer binder matrix around the fibers and flakes. Because the PIs are in close proximity to the fibers (and in some instances chemically bonded to the fibers) a faster, more uniform, and tighter formation of the binder matrix around the fibers may occur. In addition to (and sometimes in lieu of) the PIs, other polymerization promoters may be included in the present sizing compositions, such as polymerization catalysts, co-initiators, co-catalysts, electron donors, accelerators, sensitizers, processing aids, and release agents, among other compounds. These polymerization promoters (including PIs) may also be present in the resin composition that forms the polymer binder matrix.

The sizing compositions may include one or more polymerization initiators (PIs) and/or catalysts in a liquid, such as water or an organic solvent. The PIs and catalysts (among other polymerization promoters) may facilitate polymerization by, for example, speeding polymerization of monomers and/or oligomers in the resin composition. The polymerization catalysts may include reducing agents such as metal salts.

The PIs in the sizing compositions may be immediately reactive with resin composition, or they may require activation before they spontaneously initiate polymerization when in contact with the resin. For example, the PIs in the sizing composition, and/or the sized fibers or flakes, may be thought of as PI precursors that undergo an activation reaction (e.g., a bond cleavage) become a spontaneously reactive PI. Exemplary PIs may include compounds that have a free radical moiety, or more likely a precursor compound capable undergoing homolytic bond cleavage to form a free radical moiety. Examples of PIs that have or form free radical moieties include peroxides, peroxyacid esters, peroxides, and hydroperoxides, among others. Additional examples of PIs may include ketone peroxides for vinyl esters and unsaturated polyesters dissolved in styrene and/or vinyl toluene. Still more examples may include benzoyl peroxide, which may be used in acrylate-based resin compositions, among others.

Exemplary polymer catalysts may include, without limitation, metallic salts of $C_8$ to $C_{12}$ carboxylic acids including hexanoic acid, 2-ethyl hexanoic acid (octanoic acid) and nephthanoic acid, metals including cobalt, manganese, zirconium vanadium, barium, zinc, calcium copper, strontium, iron and rare earth metals including cerium and nbeodymium. Aluminum and lithium are also usable. Lead can also act as a catalyst, but may have limited use due to environmental concerns. Catalytic metals may be applied directly to the surfaces of glass fibers and flakes using techniques such as flame spraying, plasma vapor deposition and running glass fibers through molten metal, among others. Another approach is to apply metal carbonyls to fibers and flakes. Metallic salts dissolved or dispersed in solvents may be part of the sizing composition applied to fibers and flakes, and these salts are generally used with peroxides, hydroperoxides and perolyacid esters. Specific examples of these metals and metallic salts used as polymer catalysts include cobalt and cobalt salts. Exemplary polymerization promoters may also include N,N-dialkyl aniline derivatives for increasing the polymerization rate. These amines may be used as promoters for PIs including diacyl and diaryl peroxides, such as benzoyl peroxide.

The PI(s) and catalyst(s) on the surfaces of the fibers and flakes may be chemically bonded to the surfaces with a coupling agent, or physically bonded to the surfaces with a film former, and the PI(s) and catalyst(s) can also be encapsulated in a resin or polymer and these bonded to the surfaces of the fibers and flakes. The present sizing compositions may also contain lubricants, surfactants, biocides, fungicides, antifoam agents and film formers, among other compounds.

Additional embodiments of the sizing composition may include a silane compound capable of chemically bonding to a surface (e.g., a glass surface) on the fiber and/or flake. In some instances, the silane compound may have a silane moiety (e.g., an alkyl or alkoxy silane moiety) that make up part of the PI. In additional instances the silane compound may initially be separate from the PI, but capable of chemically bonding to both the fiber and/or flake at one site, and the PI at another site. The silane compound (or silane moiety) may be capable of chemically bonding to the fibers, particularly to fibers containing silica or a compound containing silica, and the PI will become bonded (e.g., chemically bonded) to both the fiber and the polymer matrix, providing for greater interfacial strength between the reinforcing fibers and the thermoset resin matrix.

Embodiments may include promoter precursors in addition to, or in lieu of, immediately reactive promoters. For example, a sizing composition may include, in addition to or in lieu of an immediately reactive PI, one or more PI precursors. An additional example includes sizing compositions that containing one or more catalyst precursors in addition to, or in lieu of, one or more immediately reactive catalysts. Where more than one precursor is required, one or more precursors can be present in the size composition, or one or more precursors can be present in a first size composition and the other precursor(s) can be present in a second size composition applied after the first size composition is applied with or without a drying step intermediate the sizing applications. These sizes may also be applied to fibrous webs in the wet, nonwoven mat forming processes and the and dry, nonwoven mat forming processes disclosed earlier, and also to the woven fabric, followed by drying.

The fibers and or flakes are made using processes and the sizing compositions applied to the fibers and flakes using the present methods and equipment. Flakes, usually glass flakes, when used in the embodiments of the invention requiring a sizing on the glass are prepared by spraying the size composition onto the flakes while being stirred in a mixer that does not significantly degrade the flakes, to disperse the size over the surfaces of the flakes followed by drying the sized flakes. Exemplary reinforcing fibers used in the reinforced composites include glass fibers, such as E glass. Additional examples of reinforcing fibers include non-glass organic and/or inorganic fibers, such as polymer fibers, carbon fibers, mineral fibers, etc. Embodiments may further include blends of glass fibers and/or flakes with non-glass fibers and/or flakes. Other reinforcing fibers useful in place of all, or a portion of the glass fibers may include, slag fibers, carbon fibers, ceramic fibers, alumina fibers, silica fibers, rock fibers including basalt fibers, asbestos, wollastinite fibers, fibrous talc, metal fibers and polymer fibers including fibers of aramid, polyester and polyethylene.

Embodiments of the invention also include the sized reinforcing fibers and flakes described above. Embodiments of the invention may further includes methods of applying the sizing containing the PI(s) to the reinforcing fibers in a secondary fiber coating application. This secondary coating application can be prior to the fibers being chopped or wound, after the fibers are dried followed by another drying step, or when the fibers are used to make a nonwoven mat, nonwoven or woven scrim or woven fabric, the sizing can be impregnated into the mat, scrim or fabric by spraying or passing a excess of sizing onto the mat with the excess passing through the mat to be collected and reused. In the case where the nonwoven mat is made by a wet process, the sizing can be applied, alone or in a binder mixture, to the wet web of fibers before drying the sized mat, and curing the binder if present. When the mat is formed by a dry process, the initiator sizing can be applied to the dry web, alone or in a binder mixture, followed by drying the mat, and curing the binder if present. Embodiments may include each of these methods of making fibrous performs in which the fibers are coated with one or more PI(s), precursor(s) thereof, or one or more promoters or catalysts or precursor(s) thereof.

Where fiber preforms are made to shape by a wet process, the sizing containing the PI(s) or catalyst(s) can be in the water of the slurry, or can be sprayed onto the preform in excess after the wet preform has been formed and the excess sucked through the perform as in the mat application. Where the preform is made by hand lay-up or spray-up, the sizing containing the PI(s) or catalyst(s) with or without a binder, may be sprayed onto the collected chopped fibers, strands or rovings as the thickness of the perform is being built up.

Optionally, all of the fibers and/or flakes, and the resin-PI(s) and/or catalyst(s) mixtures may be preheated to or near the desired polymerization temperature before being injected into molds and/or preforms. When molds are involved, it is typical, but not necessary, that the molds also be preheated at least above the polymerization temperature of the resin(s) or resin mixture(s). After forming, the composite may be placed in a hot environment (in or out of the mold) to complete the polymerization to the desired degree. The total polymerization time may depend upon the temperature and degree of polymerization. Exemplary times include may range from about 5 to about 15 minutes, which may or may not include the up to about 10 minutes if the one or more polymerization activators are formed in situ on the fibers in the initial stage of impregnating the reinforcing fibers with the one or more monomers. In the latter case, if more time is needed to complete polymerization at the higher temperatures, another few minutes up to about 10 minutes may be required because during this amount of time the reinforcements and mold temperature will be held at about 120° C.. to first form the activator(s) before raising the temperature to the higher, polymerization temperatures.

Thermosetting resins may include, but are not limited to, unsaturated polyesters, vinyl esters, acrylates that cure via free radical polymerization. Embodiments may include methods of making reinforced composites (e.g., Thermoset fiber reinforced composite ("TSFRC")) parts or products using the reactive fibers or flakes described above in RTM or vacuum infusion or impregnation processes where the reactive fibers are formed into mats or performs and placed into molds and resin mixtures, preferably containing an appropriate amount of one or more PI(s) or precursor(s) thereof and preferably preheated to temperatures in the range of about 32° F. to about 270° F. is injected into the reactive fiber performs, mat, woven fabric or scrim, etc., preferably heated to a temperature to rapidly polymerize the thermosetting resin mixture upon contact with the reactive fibers and/or flakes, molded into a desired shape, removed from the molds and optionally placed into a heated atmosphere to complete the polymerization and cooled to form TSFRC parts and products. These processes are simpler to use and less costly than prior art processes.

Exemplary embodiments of methods of sizing and/or activating glass fibers or flakes may include methods where one or more polymerization promoters (e.g., PIs, catalysts, etc.) in a sizing composition are used to size the fibers or flakes. For example, embodiments include methods of activating a glass fiber or flake to participate in polymerizing a resin. The methods may include sizing the glass fiber or flake with a sizing composition that includes a solution containing a polymerization initiator. The methods may further include activating the polymerization initiator by forming a free radical moiety on the polymerization initiator that can initiates the polymerization of the resin.

Embodiments may further include methods of sizing glass fibers or flakes. The methods may include mixing the glass fibers or flakes with an aqueous solution to make an aqueous mixture of the glass fibers or flakes, where the aqueous solution comprises a base to adjust the aqueous mixture to an alkaline pH. One or more carboxyl silane compositions may be added to the aqueous mixture, where the carboxyl silane composition reacts with surfaces of the glass fibers or flakes to chemically bind the carboxyl silane composition to the glass fibers or flakes. One or more metal halide compounds may also be added to the aqueous mixture, where the metal halide compound reacts with the carboxyl silane to form a metallic carboxylate promoter that is chemically bonded to the glass fibers or flakes. The metallic carboxylate promoter promotes the polymerization of an organic resin.

Embodiments may still further include methods of making a glass reinforced composite. The methods may include sizing glass fibers or flakes with a sizing composition that includes a solution containing a polymerization initiator, and forming a free radical moiety on the polymerization initiator to make activated glass fibers or flakes. The methods may further include contacting the activated glass fibers or flakes with a polymer resin, where the activated glass fibers or flakes initiate the polymerization of the resin around the glass fibers or flakes to form the glass reinforced composite.

Herein, when a range of number values is disclosed it is to be understood by those of ordinary skill in the appropriate art(s) that each numerical value in between the upper limit and the lower limit of the range is also disclosed, to at least 0.01 of a full number. Thus in a range of 1 to 10, this includes 2.04 to 10, 3.06 to 8 or 8.50, and so on. The addition of a new limitation in a claim previously stating from 2 to 7 changing it to from 3-7 or 4-6 would not introduce new matter whether those new ranges were specifically disclosed in the specification or not because of this explanation of the meaning of a disclosed broader range, such as 1-10. This meaning of a range is in keeping with the requirement in 35 USC 112 that the disclosure be concise.

Further, when the word "about" is used herein it is meant that the amount or condition it modifies can vary some beyond that stated so long as the advantages of the invention are realized. Practically, there is rarely the time or resources available to very precisely determine the limits of all the parameters of one's invention because to do so would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors' disclosure and understanding the inventive concept and embodiments disclosed, the inventor and others can, without inventive effort, explore beyond the limits disclosed to determine if the invention is realized beyond those limits and, when embodiments are found to be without any unexpected characteristics, those embodiments are within the meaning of the term "about" as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

DETAILED DESCRIPTION OF THE INVENTION

Figure 1:
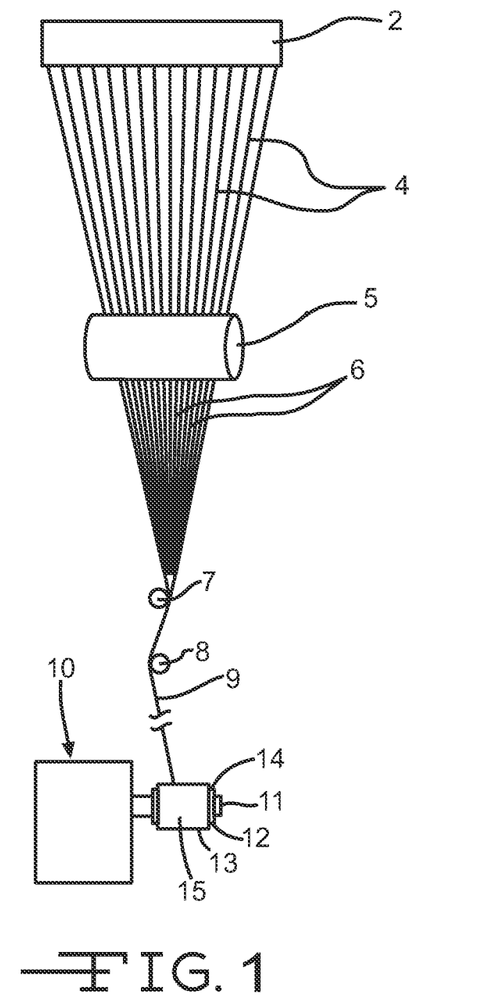
FIG. 1 is a simplified schematic drawing of a continuous glass fiber manufacturing system for making wound, reinforcing fiber products according to embodiments of the invention.

Fibers may be coated with the present sizing compositions by, for example, spraying the fibers with the size or by pulling the fibers over a size application member of a sizing applicator. Referring to FIG. 1, glass fibers 4 are produced by a bushing 2 and following air and water spray cooling are pulled into contact with a sizing applicator 5 to coat the fibers with the sizing composition. The chemically coated, wet fibers are next pulled into contact with a grooved pulley 7 that gathers all of the fibers 4 from the bushing 2 into one or more strands 9. A second grooved pulley 8, either offset from the first grooved pulley 7, or with the strand(s) 9 passing on an opposite side of the pulley 8, or both to provide some additional strand tension for a winder 10 located on the floor of the forming room below and offset from bushing 2. The fiber strands 9 can contain any number of fibers from a few hundred to more than 6000.

In systems for making continuous, wound sized fibers or sized fiber strands, the fibers 4 and the fiber strands 9 are typically pulled at the desired speed by a winder, such as the roving winder 10 having a rotating spindle 11 and a removable sleeve 12 on which to wind a roving package 13 having square ends 14 and a relatively smooth outer diameter 15 of a desired size. Following completion of the roving package 13, the roving winder 10 indexes to place another rotating mandrel 11 into place containing a fresh sleeve 12 and the strand(s) 9 are transferred manually or automatically to the fresh sleeve to make another roving package 13 without disrupting the pulling of the strand(s) 9. Instead of a roving winder, a different type of winder for winding cakes, bobbins or other package shapes may be used. After the wet packages are removed from the winder they are dried to remove all or most of the liquid carrier, to complete any coupling reaction(s) and to cure any film former in the sizing. The dried rovings or yarns are then processed to make the reinforcing fiber and reinforcing roving and yarn products that may be used in, for example, weave fabrics. In additional embodiments the reinforcing fibers and/or roving may be chopped and used in fiber reinforced polymer composite products and parts.

Figure 2:
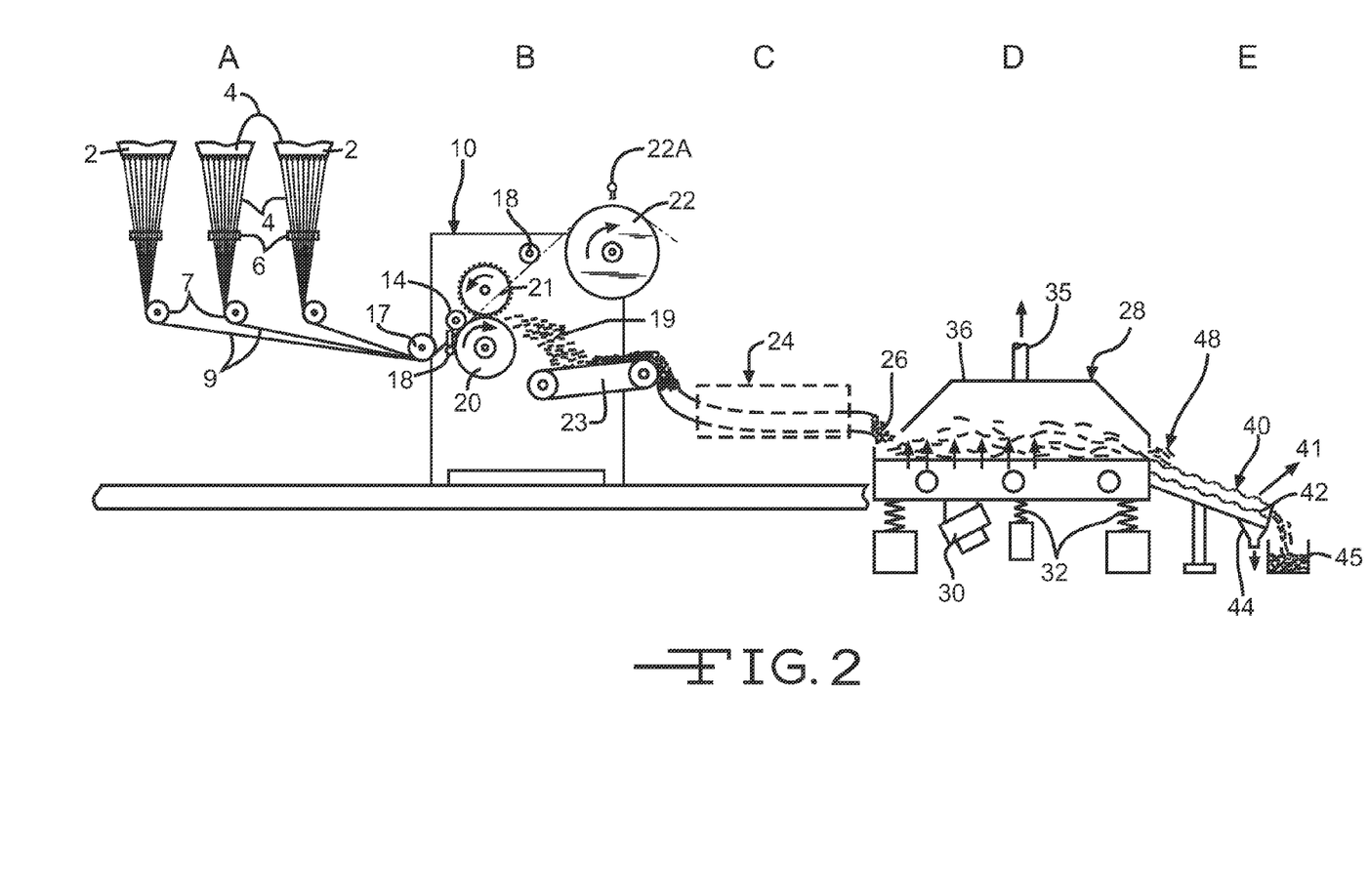
FIG. 2 is a simplified schematic drawing of a system for making desired lengths of chopped reinforcing fibers and fiber strands according to embodiments of the invention.

Other reinforcing fiber products used to make reinforced composite parts or products include wet and dry chopped sized fibers and wet and dry chopped fiber strands. FIG. 2 shows an exemplary system used to manufacture wet or dry chopped, sized fibers and fiber strands, or optionally agglomerated wet and dry chopped sized fibers and sized chopped fiber strand products. In FIG. 2, different system portions are labeled as A, B, C, D and E. Portion A is the fiber forming part of the system and can be the same as the fiber forming system shown in FIG. 1, except that in this system the fibers or strands of fibers 9 are pulled around gathering wheels 7, typically, but not necessarily, moving away from the turning wheels 7 in a generally horizontal orientation towards a chopper 16. Portion B is a chopper 16 for separating fibers and fiber strands 9 into lengths 19 of about 0.06 inch up to 5 inches long or longer with typical lengths being 0.125 inch, 0.25 inch, 0.5 inch, 0.75 inch, 1 inch, 1.25 inces, 1.5 inches, etc. The chopper 16 shown in FIG. 2 is comprised of a guide roll 17, a backup roll 20 with a pulling roll 19 running against it and fibers or fiber strands 9 on the surface of the backup roll. A blade or cutter roll 21 set to cause a plurality of blades mounted in the blade roll 21 to push against the fibers or fiber strands 9 on an elastomeric surface of the backup roll 20, penetrating the elastomeric surface to some depth results in producing the desired lengths of wet, sized fibers or fiber strands 9. Other components include elements for starting a new fiber or a new fiber strand into the chopper 16 without interrupting the running fibers or fiber strands 9 and comprise an accelerating roll 22, a sensor 22A to start the accelerator roll and a strand manipulator 18 to pull the new strand into the nip between backup roll 20 and the pulling roll 19 once the new fiber or fiber strand is running at a desired speed.

The chopped fibers and/or fiber strands 19 are collected, typically on a conveyor belt or vibrating conveyor and can be either packaged wet, used wet close by, or further processed. Portion D is a drying part of the system. One option is to feed the wet, chopped fibers into a dryer like a vibrating fluid bed dryer 28, mounted on a plurality of springs 32 and equipped with one or more vibrators 30. The wet, chopped fibers and/or fiber strands are fed onto a perforated bed having holes therein of a size such that the fibers and/or fiber strands will not fall through, especially as hot air is flowing upward through the holes and into the vibrating, often suspended layer of chopped fibers and/or fiber strands to remove the liquid carrier, complete any coupling reaction(s) and to cure any film former that is on the surface of the fibers. The hot, moist air is exhausted through a stack 35 and a top cover 36 contains the fibers and fiber strands in the dryer 28.

Portion E is an optional sorting and packaging portion of the system. The hot, dry chopped fibers and/or fiber strands 48 can optionally flow into and through a size sorter 40 containing two or more screens 41 and 42 to remove any oversize and under size (fuzz) material from the desired product, discarding the material removed through a chute 44, and to cool the chopped, reinforcing fibers and/or fiber strands before being packaged into packages 45.

Portion C may be used to produce pellets or agglomerates of the chopped fibers and/or fiber strands 19; the latter may be fed into an agglomerator/pelletizer 24 that will agglomerate a plurality of the chopped fibers and/or fiber strands 19 into separate pellets or football shaped agglomerates and densify the pellets and/or football shaped agglomerates 26 before feeding them into the dryer 28. The densified pellets and/or football shaped agglomerates 26 may be packaged wet for shipment or use on the premises.

The sizing compositions may include one or more PI(s) for polymerizing the resin(s). The PI(s) include free radicals, elements, compounds, and ions having unpaired electrons on an open electron shell or ring including such compound groups as azonitriles and azo-derivatives, alkyl peroxides, acyl peroxides, hydroperoxides and ketone peroxides, peresters, peracids, peroxy carbonates, peroxy carbamates, persulfates and similar materials.

One or more polymerization promoters, including PIs, catalysts and/or precursors thereof may be present in the thermosetting resin. Alternately (or in addition) one or more of the same or different polymerization promoters may be present in the sizing composition and eventually the sized fibers and/or flakes. For example, the sizing composition may include one or more of the polymerization promoters discussed above.

The sizing compositions may also include a liquid, such as water, deionized (DI) water, distilled water or mixtures thereof. Alternatively, the liquid may be an organic solvent, such as aliphatic and aromatic hydrocarbons, ethers, esters, nitriles, and amides, among other organic solvents.

Chemical sizings applied to the surfaces of the fibers and flakes, particularly glass fibers and flakes containing silica and alumina, typically contain a silane coupling compound, an optional lubricant, and sometimes a film former, but the film former is optional for some products. The coupling agent silane acts as the chemical linking agent by bonding to the glass fiber and flakes and also to the polymer/copolymer matrix. Silanes containing organosilane groups are coupling agents for glass fibers and organic (e.g. polymer) phase, and serve to covalently bond the organic groups in the compound to groups on the inorganic surfaces.

One or more lubricants protects the surface of the fibers essential to maximize the strength of the fibers, preventing damage from scratches, etc. caused by fiber-to-fiber rubbing abrasion and from processing equipment. The optional film former provides the desired degree of bond between the fibers in the fiber strands to avoid fuzzing and excess filamentation during processing in the fiber manufacturers operations and/or in the composite manufacturers' operations. Some typical sizing compositions are illustrated in the following examples.

EXAMPLE 1

A solution is prepared by dissolving 247 grams of 3-isocyanatopropyl triethoxy silane in 1000 grams of dioxane. To this solution is added 132 grams of 6-hydroxy hexanoic acid at ambient temperature and stirred at 50° C.. until dissolved. To the resultant solution is added 1 gram of dibutyl tin dilaurate dissolved in 10 grams of dioxane. The temperature was kept at 50° C.. using a water bath for entire 10 hours reaction time. The resulting carboxyl functional silane was utilized to treat 1000 grams of glass fibers and glass flakes in DI water to attach the silane to the glass surfaces at a concentration of 1 wt. percent of silane compound, based on the dry weight of the glass fibers or flakes. To accomplish this 5 grams of sodium bicarbonate dissolved in 20 grams of water was added to the DI water and glass fibers or flakes to convert the acids to sodium salts. Further treatment of the dispersed fibers or flakes in this water with 10 grams of cobalt chloride, manganese chloride or other metal chlorides generated one or more metallic carboxylate promoters chemically bonded to the surfaces of the glass fibers or flakes, i.e. reactive fibers or flakes. These reactive fibers and/or flakes were then used to promote free radical polymerization of unsaturated polyester/styrene and/or vinyl esters in the presence of appropriate amounts of dissolved cumyl hydroperoxide, t-butyl hydroperoxide or MEK-peroxides in the resin(s).

The fibers, mat(s) and/or fabrics can be run through a bath of the aqueous treatment solution described above followed by drying to produce reactive fibrous reinforcements to use to produce performs. Also, the aqueous treatment solution can be fed to whitewater in a wet mat forming process to produce performs, followed by drying, for use in forming the TSFRC parts and products. Glass flakes can be screened from the treating solution and dried to use in the resin-PI(s) mixture just prior to filling a hot mold or casting into a hot mold. Also, continuous glass fibers made in a process like that shown in FIG. 1 can be sized in a manner using a sizing applicator with a continuous feed of the aqueous treating solution, containing the catalyst, as described above.

EXAMPLE 2

In this sizing treatment 247 grams of 3-isocyanatopropyl triethoxy silane are dissolved in 1000 grams of tetrahydrofuran (THF). To this solution is slowly added 137 grams of N,N dimethyl amino phenol at ambient temperature followed by stirring for 2 hours. The temperature was maintained below 50° C.. using a water bath. This silane was used, like the silane in Example 1, to size glass fibers and flakes in the methods described above to produce reactive fibers and flakes having 1 wt. percent of PI chemically bonded.to the surfaces of the fibers and flakes based on the dry weight of the fibers and flakes. These reactive fibers and flakes were used to promote free radical polymerization of acrylate resins in the presence of benzoylperoxide dissolved in the resins.

EXAMPLE 3

A blue color wax was made by dispersing 10 grams of a promoter, catalyst, cobalt naphthanate, in 90 grams of molten paraffin wax having a MP of 40° C. and this blue wax was dispersed under high shear in 1000 grams of glass fibers dispersed in a whitewater containing 5 grams of POE (20) sorbitan monolaurate (Lonzest SML-20) dispersing agent, supplied by Lonza, Inc. of Basel, Switzerland. The whitewater was maintained at ambient temperature during dispersion to avoid melting the cobalt-paraffin wax. The glass fibers were then separated from the whitewater using a forming screen and vacuum dried at ambient temperature. The dry fibers were then used to promote free radical polymerization of unsaturated-styrene and vinyl esters in the presence of a PI, MEK peroxide, when the resin was heated to 35° C. to dissolve/melt the paraffin wax to release the catalyst, cobalt naphthanate.

EXAMPLE 4

A treating solution was produced by dissolving 247 grams of 3-isocyanatopropyl triethoxy silane in 1000 grams of THF and to this solution was added 152 grams of cumene hydroperoxide at ambient temperature. The temperature of the solution was then reduced to 0° C. and 0.5 gram of dibutyl tin dilaurate was stirred in and stirring was continued for 2 hours. This solution was then applied to glass fibers and flakes to chemically bond 0.5 wt. percent of the silane PI onto the fibers and flakes based on the dry weight of the fibers and flakes to produce reactive glass fibers and flakes. These reactive fibers and flakes were then used to promote free radical polymerization of styrenic, vinyl esters and acrylate resins in the presence of metallic promoters dissolved in the resins. A combination of 0.2 wt. percent cobalt, 0.2 wt. percent manganese and 0.3 wt. percent of calcium (used in a calcium salt compound), or 100-200 ppm of tin and 1-10 ppm of copper were also found to be effective catalysts for these carbamate-silane coupled glass reinforcements at ambient temperatures.

EXAMPLE 5

A treatment solution was prepared by adding 24.8 grams of Dibenzoyl peroxide (BPO) to 10,000 grams of THF at ambient temperature and then adding 1000 grams of glass fibers or flakes while agitating to disperse the fibers and/or flakes in the treating solution. Next the THF is evaporated under vacuum forming a thin white coating of BPO on the fiber/flake surfaces. The fibers or flakes were then used to initiate free radical polymerizaton of acrylate resins containing N,N dimethyl p-toluidine.

In all of the above examples the ratio of PI to resin was from 0.01 wt. percent to about 10 wt. percent, more typically from about 0.1 wt. percent to about 5 wt. percent and most typically from about 0.5 wt. percent to about 3 wt. percent. The ratio of catalyst, promoter to resin was from 0.01 wt. percent to about 10 wt. percent, more typically from about 0.05 wt. percent to about 5 wt. percent and most typically from about 0.1 wt. percent to about 1 wt. percent.

Useful reinforcing fibers may include any type of fiber product normally used to reinforce natural or organic polymers including chopped fiber strands or pellets (agglomerates), chopped fiber rovings, chopped strands from wound cakes and assembled rovings, gun roving, chopped or long slivers, nonwoven fibrous mats and woven fiber fabrics. Glass fibers and flakes are most typically used, but other fibers and flakes including polymers, copolymers, ceramic, other inorganics including carbon fibers, metal fibers and flakes and natural fibers can be used. The reinforcing fibers can be of any lengths, but normally will be at least 0.06 inches long up to lengths exceeding 100 feet. Normally the reinforcing fibers will be dry, but can contain up to about 0.5 wt. percent moisture or solvent, preferably less than 0.3 wt. percent and most preferably less than 0.2 or even less than 0.1 wt. percent.

In many of the embodiments of the invention, novel sized fibers are made and used as reinforcements in polymers formed in situ around the novel sized reinforcement fibers. One example of a system useful in making the present sized reinforcing fibers in a wound form is shown in FIG. 1. Fibers 1, including glass or polymer fibers, are formed by passing a molten form of the glass or polymer, etc. through orifices or nozzles on the bottom of a refractory metal bushing 2 heated to the fiberization temperature of the material being fiberized, and the fibers 4 are pulled rapidly downward at speeds exceeding from about 500-1000 ft./min to more than about 10,000 ft./min to attenuate the fibers to the desired diameter and to quickly cool the fibers 4 with air to below their softening point. A fine mist of water or other cooling fluid is sprayed onto the fibers to help cool them. The fibers 2 are then pulled into contact with a chemical sizing applicator such as a roller of a chemical sizing applicator 5 where the surfaces of the fibers are coated with one of the chemical sizings. The chemical sizings may be water based, or use a different liquid including organic solvents such as ketones, alcohols (e.g., ethanol, methanol, etc.), esters, molten caprolactam with or without an aqueous medium or a combination of water and organic solvents.

The sizing typically, but not necessarily, includes one or more coupling agents for chemically bonding the fiber to the polymer matrix chemically. Suitable coupling agents include aminosilanes, the reaction product of an aminosilane, maleic anhydride, ureidosilanes, vinylsilanes, acrylic silanes, epoxy silanes and blends thereof. A silane typically used is a product called A1100, available from OSI Specialties. This product contains 52% by weight active silane solids following hydrolysis. Another is a hydrolyzed A1100 solution in water, also available from OSI Specialties under the designation VS142 (40% solution) or from Huils under the designation A1151 (40% solution).

The size compositions can further include one or more surface modifying or coupling agents selected from functional organo silane, organo titanate and organo zirconate coupling agents. When present, the amount of functional organo-silane coupling agent can be about 0.1 to about 30 weight percent of the forming size composition on a total solids basis, and is typically about 0.5 to about 15 weight percent and more typically about 1 to about 10 weight percent.

The size compositions typically, but not necessarily, contain one or more lubricants, to protect the surfaces of the fibers and flakes and to aid manufacturing reducing friction where the wet fibers slide past, on or over guides and other physical objects. Typically a small amount, usually no more than about 0.15 weight percent of the size composition of a lubricant compatible with the liquid in the sizing is used. Suitable lubricants for this purpose include one or more of the following: a nonionic surfactant such as a block copolymer of ethylene oxide and propylene oxide, e.g. LUVISKOL K grade and PLURONIC L101 (available from BASF of Florham Park, N.J.) or SYNPERONIC PE/IL101 (available from AkzoNobel of Morris, Ill.), polyethyleneimine polyamide salt, such as EMERY 6760 (available from Henkel Corp. of Rocky Hill, Conn.). octylphenoxypolyethoxyethanol such as TRITON X100 (available from Rohm and Haas of Philadelphia, Pa.); a polyvinyl pyrrolidone, e.g., an imidazoline, e.g., an alkylimidazoline derivative such as TEGO cationic softener (available from Th.Goldschmidt AG of Essen, Germany), amine salts of fatty acids, e.g., including a fatty acid moiety having 12 to 22 carbon atoms and/or tertiary amines having alkyl groups of 1 to 22 atoms attached to the nitrogen atom), alkyl imidazoline derivatives (can be formed by the reaction of fatty acids with polyalkylene polyamines), acid solubilized fatty acid amides (e.g., saturated or unsaturated fatty acid amides having acid groups of 4 to 24 carbon atoms such as stearic amide), acid solubilized polyunsaturated fatty acid amides, condensates of a fatty acid and polyethylene imine and amide substituted polyethylene imines, such as EMERY 6717, a partially amidated polyethylene imine commercially available from Henkel Corporation of Kankakee, Ill. and ALUBRASPIN 226, available from PPG Industries, Inc. of Pittsburg, PA, alkyl imidazoline derivatives including CATION X, available from Goldschmidt Chemical Corporation (see above), and ALUBRASPIN 261, available from PPG Industries, Inc.(see above), and cationic lubricants such as silylated polyamine polymers prepared by reacting: (a) an amino functional reaction product of an aminofunctional polymer having primary or secondary amine functionality and the residue of a fatty acid moiety; and (b) an amine-reactable organo alkoxy silane and hydrolysis products thereof. When one or more lubricants are used in the sizing compositions the total amount of the one or more lubricants in the size composition can be about 0 to about 10 weight percent of the forming size composition on a total solids basis, and is typically about 0.5 to about 5 weight percent and more typically about 1 to about 3 weight percent.

The size compositions can optionally include a film former, normally for physically bonding the PI(s), PI precursor(s), catalyst(s) or catalyst precursor(s) to the fibers and flakes. Many film formers can be used including FULATEX PD-0166 and FULATEX PN-6019, both available from Fuller. FULATEX PN-6019 is a modified vinyl acetate copolymer in an anionic/nonionic surfactant system having a solids content of 53.5 to 55.5 weight percent; a pH of 3.5 to 4.5; VINAMUL™ 88127 or N.S. 25-1971 available from National Starch of Bridgewater, N.J.. This copolymer containing from about 53.5 to 55.5 weight percent solids, and having a pH of 4 to 5, FULATEX PD-0166 and FULATEX PN-6019, which are both available from the H. B. Fuller Company of St. Paul, Minn. FULATEX PN-6019 is a modified vinyl acetate copolymer in an anionic/nonionic surfactant system with the following typical properties: solids content of 53.5 to 55.5 weight %; viscosity of 100 to 600 cps; pH of 3.5 to 4.5; and a residual monomer content of 0.5% or below. An especially preferred copolymer is VINAMUL™ 88127, which is available from Vinamul U.K. or from National Starch under the product code N.S. 25-1971. This copolymer typically contains from 53.5 to 55.5% by weight solids, has a pH of 4 to 5, and a viscosity of from 100 to 400 mPa s. The film-forming material can also be one or more N-vinyl amide polymers prepared from a cyclic monomer, for example N-vinyl-2-pyrrolidone, N-vinyl-2-piperidone, N-vinyl-.epsilon.-caprolactam, N-vinyl-5-methyl-2-pyrrolidone, N-vinyl-3,3,5-trimethyl-2-pyrrolidone, N-vinyl-3-methyl-2-pyrrolidone, isomers, derivatives and mixtures thereof. When one or more film formers are present in the size compositions the total amount of film former present can be about 0.1 to about 15 weight percent of the forming size composition on a total solids basis, and is typically about 1 to about 10 weight percent and more typically about 1 to about 5 weight percent.

The present size compositions can also optionally contain one or more of emulsifying agents, surfactants, plasticizers, film former modifiers, biocides and other size composition functional aids. The size can also include a pH adjusting agent, such as an acid or a base, in an amount sufficient to achieve a desired pH, typically being in the range of from about 6 to about 10. Useful acids include acetic, citric, sulfuric, phosphoric and similar acids. Useful bases include ammonium hydroxide, amines and metal hydroxides. Buffer solutions can also be used. Each size composition is applied to the fibers and flakes and usually dried with the dried solids of the size being present on the fibers and flakes in an amount in the range of about 0.1 to about 5 weight percent, based on the weight of the dry fibers and flakes, typically in the range of about 0.3 wt. percent to about 3 wt. percent and more typically in the range of about 0.5 wt. percent to about 2 wt. percent, normally measured by a loss on ignition (LOI) test of the fiber or flake products.

Figure 3:
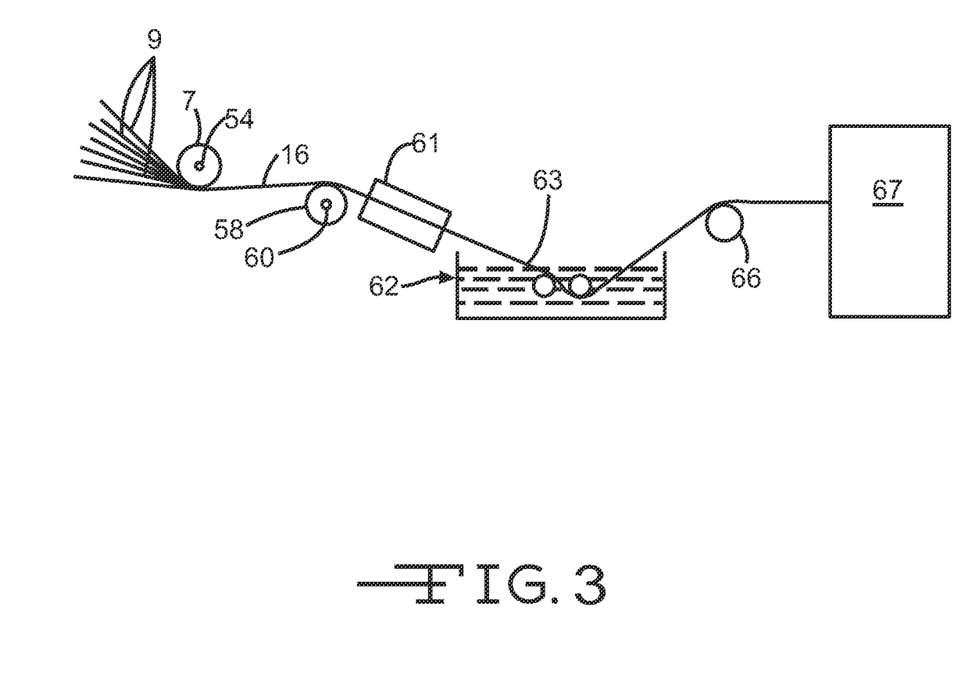
FIG. 3 is a simplified schematic drawing of a system for applying a second size composition to fibers or fiber strands according to embodiments of the invention.

Some of the sized, reinforcing fibers and/or fiber strands may use a two step sizing application were different sizing compositions are used in each of the sizing steps. One system for use along with a system for making first sized fibers, including the systems shown in FIGS. 1 and 2, for making such dual sized fibers and/or fiber strands is shown in FIG. 3. Here wet, sized fibers 9 sized with a sizing composition, such as those coming from the systems shown in FIGS. 1 and 2, are gathered and turned with the turning roll 7 rotatable on an axle 54, then optionally onto a second roll 58 rotatable on an axle 60 and through a dryer 61 to optionally remove at least some of the liquid of the first sizing, and/or to gel the first sizing, and then onto other rollers 64 submerged in a different sizing in a container 62. The fiber(s) and/or fiber strands 65 coated with the second sizing composition is pulled from the container 62 by either a winder or chopper 67. From that point the wound or chopped sized fibers can be used, packaged wet or palletized, agglomerated and used or packaged or dried, optionally sorted, and packaged as described above in the description of FIGS. 1 and 2.

Other reinforcing fiber products include fibrous nonwoven mats and woven fiber fabrics using either the sized reinforcing fibers made in the systems disclosed above, or reinforcing fibers that are sized with the sizing compositions during manufacture of the nonwoven mats and fabrics.

Figure 4:
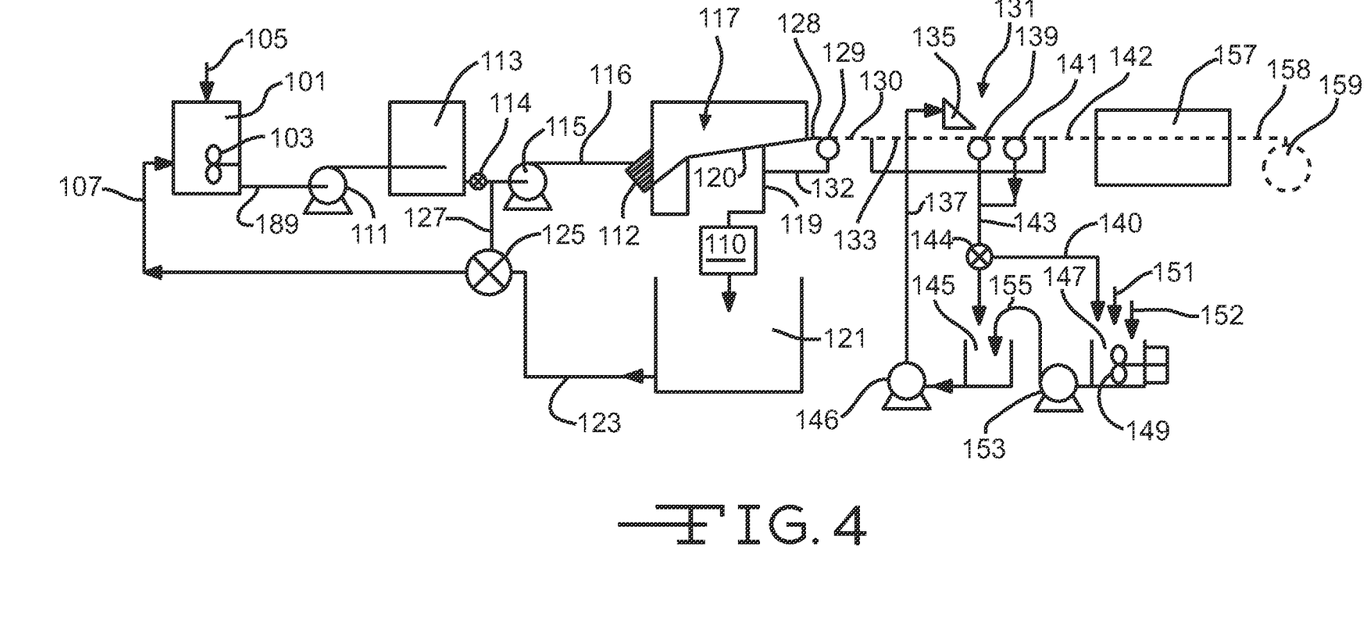
FIG. 4 is a simplified schematic drawing of a system for making a nonwoven mat and applying a sizing to fibers in the nonwoven mat according to embodiments of the invention.

FIG. 4 shows a simplified schematic of a wet former system for making multi-layer nonwoven mats and further contains an optional second stock preparation system. Sized fibers and/or flakes 105 are fed, typically continuously, but batch type preparation may also used, into a pulper 101 containing forming liquid, usually an aqueous forming liquid flowing in a return pipe 107. Mixing takes place in the pulper 101 with an agitator 103 to form a relatively concentrated slurry that exits the pulper 101 through pipe 109 and into a pump 111 that pumps the concentrated slurry into a holding tank 113. The forming liquid may be delivered to pipe 107 by pump 125, pumping the forming liquid coming from a pipe 123 and a de-airing tank 121. Concentrated slurry may be metered out of the holding tank 113 by a pump 115 and variable flow valve 114 where the concentrated slurry is diluted substantially with the forming liquid coming through pipe 126 to a forming pump 127. The substantially diluted slurry, which may have a solids concentration of less than about 0.04 percent, may flow through pipe 116 to a distribution manifold 112 on a forming box 117.

The slurry may flow toward a moving permeable forming belt 20 where the fibers and any particulates in the slurries may be formed into a wet, nonwoven web while the forming water may flow through the forming belt as return forming liquid 119 and onto the de-airing tank 121. A final suction tube assembly 129 under the forming belt 120 near where the wet web may be removed from the forming belt 120 removes excess forming liquid from the wet web and returns it through pipe 132 to the de-airing tank 121. The wet web may then be transferred to a second moving permeable belt 130 that carries the wet web under an applicator 135, preferably a curtain coater type, where a sizing with or without a binder, may be applied in an application section 131. Excess sizing and/or binder may be removed from the wet, fibrous web or mat with suction tube assemblies 139 and 141 to reduce the sizing and/or binder level in the wet web to the desired level. The coated web is then transferred to an oven belt 142 and passed through an oven 157 where the mat may be dried and any film former resin(s) in the sizing and/or binder are cured. The dry mat 158 may then be wound into a roll 159 for packaging or use nearby.

The fibers in the mats containing an optional binder may be bound together with a resinous binder. In some embodiments nonwoven mat may not contain any binder. The binder is usually an aqueous mixture of water and one or more resins or polymers and other additives in a solution, emulsion or latex. The sizing, binder or combination is prepared by adding one or more ingredients 151 with a liquid 152, normally water, to a mix tank 147 containing an agitator 149. Excess binder, sizing or mixture removed from the wet web with suction boxes 139 and 141 can also be added to the mix tank 147 by way of return pipe 143. The mixed sizing, binder or mixture of the two is then pumped with pump 153 to a holding tank 145 to supply an applicator pump 146 that meters the sizing, binder or mixture of the two at the desired rate using variable valve 144 to the applicator 135.

Figure 5:
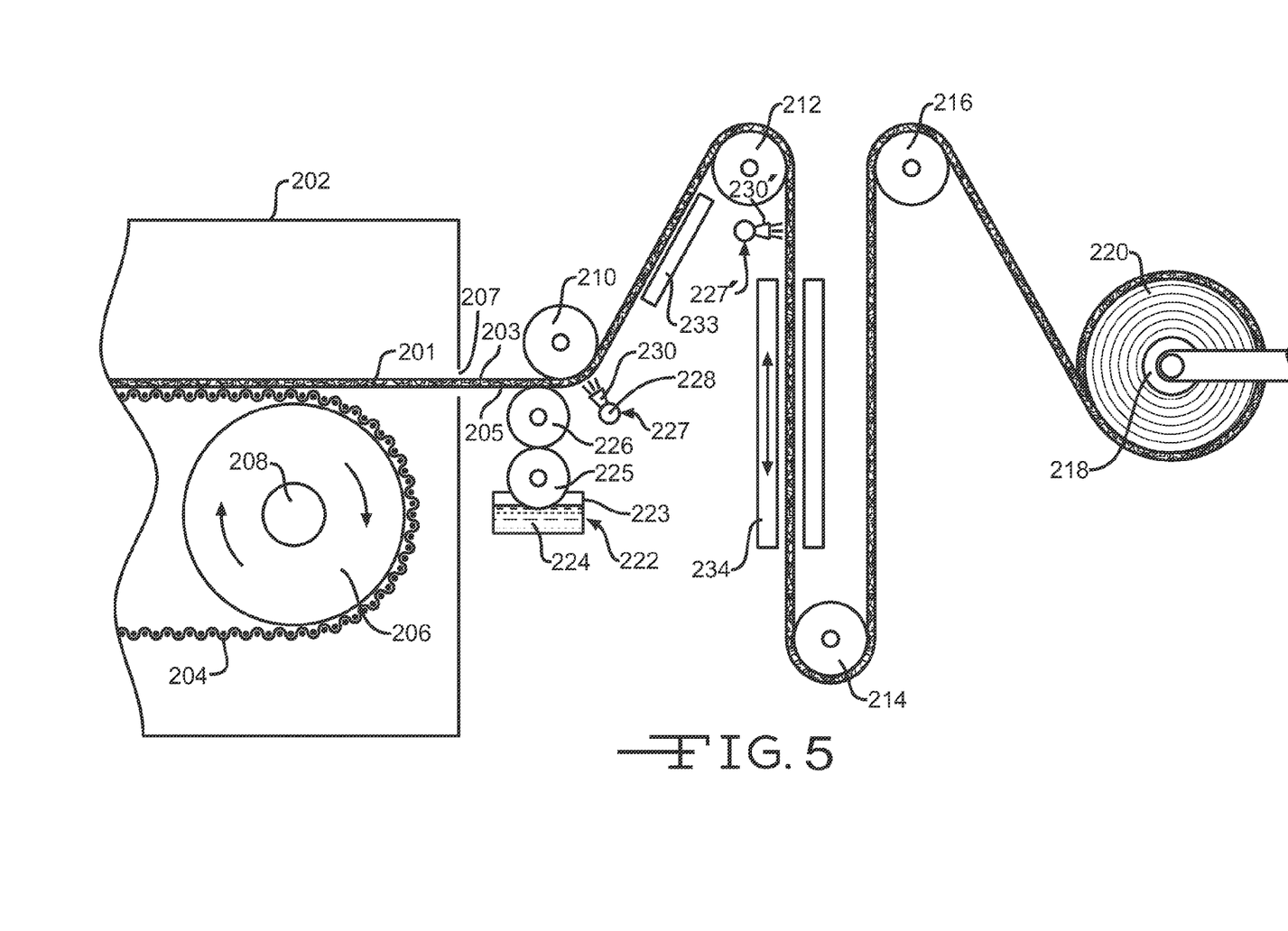
FIG. 5 is a f simplified schematic drawing of a portion of a nonwoven mat system showing an additional system for applying a one or more sizings to a nonwoven fiber mat or to a woven fabric according to embodiments of the invention.

It is sometimes desirable to add a second sizing to the fibers in a nonwoven mat or in a woven fabric. FIG. 5 shows a simplified schematic of a system useful in adding one or two sizing compositions to the reinforcement fibers in a nonwoven mat or a woven fabric. For woven fabrics, the system of FIG. 5 may be used to add one or two different sizing compositions to the woven fabric as the fabric comes off of the loom, or in a separate step.

When used with the wet process in FIG. 4, a dryer chain/screen 204 carries the wet to dry, hot nonwoven mat 201 through the dryer 200 driven by a tail pulley 206 mounted on axle 208. The hot, dry mat 203 exiting the dryer is then typically wound up into rolls 220 on a mandrel 218 supported by arms 219 of a winder (e.g., an indexing winder). Other rolls 212, 216 and at least one movable accumulator roll 214 provide enough slack to allow the winder to doff the mat, rotate a finished roll 220 out of position and a fresh mandrel into winding position to start winding a new roll 220.

Numerous methods can be used to produce dry fibers with two sizing steps separated by one or two drying steps. For example, a first size is applied with the sizing applicator 6 shown in FIG. 2. The sizing may contain either a PI, precursor(s) for a PI, an appropriate catalyst(s), or precursor(s) for the catalyst(s) as described above. Following chopping in the chopper 16 and drying in the dryer 28, the dry chopped fibers exit onto a second belt or chain conveyor like 19 and pass under one or more spray heads where a second size may be applied by spraying, then the second sized fibers pass into a second dryer like the dryer 28 and after exiting the second dryer the dry fibers fall onto the sorter 40, etc. In some embodiments, if the first sizing applied contains one or more PI(s), or precursors of such, then the second size may contain an appropriate catalyst, or appropriate precursor(s) of one or more catalysts and vice-versa.

Another two step sizing method comprises applying the first sizing with the sizing applicator 6 (FIG. 2) and then applying a second sizing using the dip tank 62 shown in FIG. 3, and following chopping or winding in the chopper or winder 67, the wound or chopped fibers are dried, either as shown in FIG. 2 when the fibers are chopped, or in an oven when wound.

A still further method involves sizing the fibers as shown in either of the processes shown in FIGS. 2 and 3, and then applying the second sizing as an ingredient in the binder applied to a wet web as shown at 35 in FIG. 4, or with the spray jets 27 and 27' shown in FIG. 5.

The woven or nonwoven fibrous mats are typically very permeable due to the many relatively large pores in the surface and throughout the mats. The permeability of these mats is in the range of about 50 to about 1500, preferably in the range of about 175 to about 1000 and more, preferably in the range of about 200 to about 800 cubic feet per minute per square foot (ASTM D737 test method). Referring to FIG. 5, instances where the bottom surface of nonwoven mat, woven or nonwoven scrim and/or woven fabric 203, typically coming out of an oven 200 as the final step in the process of making such fibrous materials, can be coated with a size composition in any suitable manner, such as using a roll over roll coater 223. In a typical roll-over-roll coater 223 a first roll 225 rotates in a pan 222 containing the liquid size 224, a liquid, preferably water medium, and picks up a layer of the size 224 on the surface of the roll 225 and transfers the layer of size 224 to a second, coating roll 226. The coating roll 226 "kisses" the back side of the mat or fabric 203 transferring the size to the fibers, and optionally binder coated fibers, in the mat or fabric. The amount of size applied to the mat or fabric can be controlled by adjusting the concentration of the size 224 and by controlling the amount of liquid size picked up by the first roll 225. The size quickly is moved through the mat or fabric by the size wanting to wet the fibers and then heating with one or more heaters 233, preferably hot air heaters, drives off the water or solvent in the sizing, leaving the PI or the catalyst on the fibers or the cured binder coating the fibers. The penetration of the surfactant into the mat or fabric to the opposite surface is complete by varying the concentration of the one or more of the PI(s) or one or more of the catalysts in the size 224, the amount of size applied to the mat or fabric 203, the temperature of the hot air in the one or more dryers 233 and the speed of the tail pulley 206.

If additional or more size is desired on the mat or fabric than can be applied with the coater 223, one or more optional other coating devices 227 can be used, either in the place of the coater 223 or in addition to the coater 223. For example, one or more spray jet coaters 227 comprised of a manifold 28 and spaced apart jet nozzles 30 can be used. Exemplary jet nozzles that form a mist or atomize the size 224 may be used. This system can also be used to apply a size containing one or more precursors for the PI to the mat or fabric 203.

In the embodiments requiring the fibers in the mat or fabric 203 to have a second size containing a different PI or precursor for such, or a different catalyst or catalyst precursor(s) applied prior to final drying, a second set of size applicators 227" are shown followed by one or more secondary dryers 234. The dryers 233 and 234 can be located adjacent both surfaces of the mat or fabric 203 if desired. Exemplary heaters, such as hot forced air heaters, surface combustion heaters and/or infrared heaters may used. In cases where size transfer doesn't matter, it is not necessary that the mat or fabric be completely dry prior to winding into the roll 220, or prior to stacking sheets of the mat or fabric together. Where it is beneficial to apply size 224 to the top surface of the mat or fabric 203, the application equipment is arranged to coat that side instead of the bottom side, typically with the jet spray applicators 227, 227".

Additional embodiments are provided in the examples below.

EXAMPLE 6

A TSFRC part was made using a perform of 1000 grams of glass fiber having an average fiber diameter of about 13 microns and with 24.8 grams of BPO coated onto the fiber surfaces and impregnating this perform with 1000 grams of a mixture of 995 grams of acrylate resin containing 5 grams of N,N dimethyl p-toluidine at ambient temperature. The BPO on the fiber surfaces initiated polymerization of the acrylate resin within 10 minutes at ambient temperature. Exposing the resin mixture to heat increased the cure rate. The cure rate doubled when the resin was pre-heated to 10° C.

EXAMPLE 7

A 1000 gram perform of glass fiber mat containing E glass fibers having an average fiber diameter of about 13 microns and a length of about 0.25 inch having their surfaces coated with dried sizing disclosed in Example 1 above was placed in a mold of an RTM, RIM, VARTM, Vacuum Infusion, and Reactive Injection Molding machines. The glass fiber perform was then impregnated with 1000 grams of Ludopal®, an unsaturated polyester dissolved in styrene available from BASF of Florham Park, N.J., and containing 10 grams of MEK peroxide at 25° C.. The resin was cured in 20 minutes inside the mold.

EXAMPLE 8

A 1000 grams of chopped and dried 13 micron E glass fiber strands 0.25 inch long, the fibers having been sized before drying with the sizing disclosed in Example 1 above were dispersed in 1000 grams of the resin mixture disclosed in Example 1 above and cast in a mold. The mold was at a temperature of 50° C.. and kept at that temperature for 20 minutes after which the TSFRC was cured and removed from the mold.

EXAMPLE 9

Example 7 above was repeated using 1000 gram preform of dry glass fiber having been sized with the sizing disclosed in Example 2 above. This glass fiber perform was impregnated with 1030 grams of a mixture of Ebecryl® 140?, an acrylated resin available from Cytek Industries, Inc. of Woodland Park, N.J., the mixture also containing 30 grams of BPO dissolved in the acrylated resin. After the resin mixture was impregnated into the fiber perform at 50° C.., the TSFRC was cured in 5 minutes.

EXAMPLE 10

Example 8 above was repeated, but using the fiber preform and resin mixture disclosed in Example 9 above. The TSFRC part was cured and removed from the mold in 4 minutes.

EXAMPLE 11

The process disclosed in Example 7 above was repeated, but placing a fiber perform made from the fibers coated with paraffin-cobalt naphtanate sizing disclosed in Example 3 above into a mold preheated to 40° C.. to melt the paraffin and to release the cobalt naphtanate catalyst. The Ludopal® unsaturated polyester resin dissolved in styrene containing 2 grams of MEK peroxide TSFRC part cured within 15 minutes.

EXAMPLE 12

The process disclosed in Example 8 above was repeated, but using the glass fiber preform and resin disclosed in Example 11 above with the mold at 40° C. and the resulting TSFRC part cured within 15 minutes.

EXAMPLE 13

The process of Example 9 disclosed above was repeated, but using a fiber perform made using glass fibers treated with the sizing disclosed in Example 4 above and in this example the 1000 grams of the resin mixture contained the Ebecryl® resin and 200 ppm of Sn2+, 50 ppm Cu2+ and 10 grams of dodecane thiol catalyst. The impregnated TSFRC part was cured in 5 minutes.

EXAMPLE 14

The process disclosed in Example 10 above was repeated, but using the fiber perform and resin mixture disclosed in Example 13 above producing good TSFRC parts with a similar cure time.

EXAMPLE 15

The process of Example 7 disclosed above was repeated, but using 1000 grams of dry glass fiber coated with 24.8 grams of BPO. This fiber perform was impregnated with 1000 grams of a resin mixture containing Ebecryl® resin and 5 grams of N,N dimethyl p-toludine at ambient temperature. Polymerization was complete within 10 minutes.

EXAMPLE 16

The process disclosed in Example 8 above was repeated, but using the materials and conditions disclosed in Example 15 above producing satisfactory TSFRC parts with similar cure time.

All of the examples above produced satisfactory TSFRC parts with the processes having the advantages disclosed above. For example, excellent results were achieved using the sizing compositions disclosed in Examples 1 and 2 above with the resin mixture and conditions disclosed in Example 15 above.

EXAMPLE 17

Figures 6, 7:
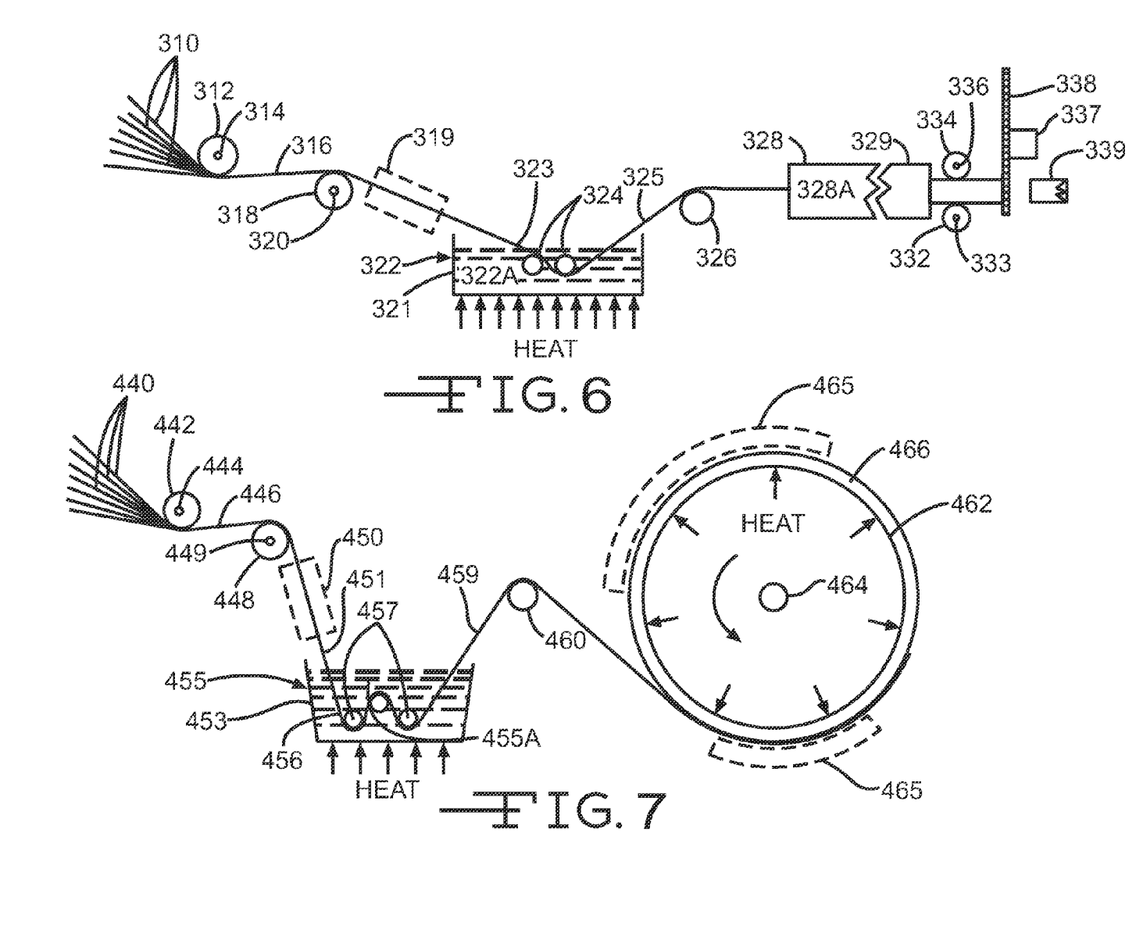
FIG. 6 is a simplified schematic drawing of a modified pultrusion system according to embodiments of the invention.
FIG. 7 is a simplified schematic drawing of a modified filament winding system according to embodiments of the invention.

Referring to FIG. 6, continuous, dry, E glass fiber strands 310, the glass fibers in the strands 310 having been previously sized with a sizing composition comprising an amount of isocyanato silane within the range of about 1 wt. percent to about 4 wt. percent, based on the weight of the dry fiber, and an amount of one or more glass fiber lubricants used in glass fiber sizings, are pulled from a plurality of roving packages on racks (not shown) by the puller rolls 332, 334 in the system. The glass fibers in this example are E glass fibers having an average diameter of about 20 micron. The glass fiber strands 310 are pulled over a multi-grooved guide roll 312 supported on a free wheeling axle 314 with one or more strands 310 being in each groove to spread out the strands 310 into a horizontal array 316 suitable for impregnation with a 500 grams of resin mixture containing 1-4 wt. percent of N,N dimethyl p-amino phenol PI. The strand array 316 is then passed over the top of a multi-grooved roll 318 similar or like the multi-grooved roll 314, also supported by a free-wheeling axle 320 and then the strand array 316 is pulled into a container 321. Optionally the fiber strand array 316 can be preheated by passing through an optional oven 319 to preheat the fibers to at least 100° C. or higher, up to a temperature in the range of about 100 to about 150° C. before entering the container 321. The container 321 is optionally heated and receives a mix 322 of resin and PI.

The temperature of the resin mixture in the container 321 is maintained or further heated in the container 321 with a heating means to a temperature of at least about 20° C. and up to about 200° C. The silane will react in situ with the N,N dimethyl p-amino phenol to produce a PI for bonding to the glass fiber surfaces. The BPO can initiate the polymerization of the resin mixture having a very low viscosity. The heated mixture 322 will rapidly impregnate the strands 310 and coat the fibers in the strands 310 with the monomer mixture 322A to form at least partially coated fiber strands 323 that can be pulled against one or more rods 324 in the container of monomer mixture 322A to spread out the fibers in the partially coated fiber strands 323 and to produce the fully coated fiber strands 325. The fully coated fiber strands 325 are then pulled out of the heated monomer mixture 322A by pulling them over a rod 326 after which they are pulled into and through a mold 328 having a tunnel profile according to the desired cross section profile of the molded part or product. At least an upstream length section 328A of the mold 328 is maintained at a temperature in the range of about 20 to about 200° C. and is sufficiently long such that the conditions within at least an exterior portion of the profile comprising a plurality of the fully coated fiber strands 325 reach a completion of the polymerization of the resin, normally requiring about 1 to about 10 minutes.

A resulting glass-reinforced TSFRC interim product 330 is then pulled from the mold 328 with opposed driven pulling rollers 332 and 334 mounted on axles 333 and 336 respectively. These driven pulling rollers 332,334 provide the pulling force for the entire process. Optionally, a final length section 329 of the mold 328 can be cooled to a temperature such that an exterior portion of the interim product 330 has stiffer surfaces for the driven puller rolls 332,334 to pull against. The interim product 330 is then cut into desired lengths using a rotating saw blade 338 mounted on a driven axle 337, or with other cutting devices, to form TSFRC parts or products 339. If necessary, or desired, the parts and/or products 339 can be further processed in an oven (not shown) to complete the polymerization of any monomer mixture in the interior portion of the product 339, and/or in a cooling chamber (not shown) to cool the product 339 to a desired temperature. Alternatively, the cutting of the interim product 330, such as with the cut off rotating saw blade 338, can be conducted following the final heating and/or cooling steps.

Thus, any profile shape and length normally made using the pultrusion process used to make fiber reinforced thermoset polymer/resin products may now be used to make fiber reinforced TSFRC parts and/or products in which at least about 95 percent of the resin is polymerized in the pultrusion process.

EXAMPLE 18

This example describes modified filament winding methods for making TSFRC products. Referring to FIG. 7, a simplified schematic drawing of a filament winding system is shown. Continuous, dry E glass fiber strands and/or strips of E glass woven or nonwoven scrim, nonwoven mat and/or fabric 440 are pulled from a plurality of roving packages on racks (not shown) and/or from rolls supported on rotating mandrels (not shown) by the puller roll 462 in the system, a rotating mandrel 462, forming TSFRC parts or product 466, to be described in more detail later. The glass fibers in the strands and/or strips 440 would have usually been previously sized, or bonded together, with a sizing or binder composition such as disclosed in Examples 1-4 above within the suitable range disclosed above, and an amount of one or more glass fiber lubricants used in glass fiber sizing compositions.

The glass fibers in this example are E glass fibers having an average diameter in the range of about 8 to about 23 microns. The glass fiber rovings or strands/strip(s) 440 are pulled over a multi-grooved guide roll 442 supported on a free wheeling axle 444 with one or more strands/strips 440 being in each groove of the grooved roller 442 to spread out the strands/strips 440 into a horizontal array 446 suitable for impregnation with a monomer-catalyst mixture. The strand array 446 is then passed over the top of another multi-grooved roll 448 similar or like the multi-grooved roll 444, also supported by a free-wheeling axle 449 and then the strand array 446 is pulled into a container 453. Optionally the fiber strand array 446 can be preheated by passing through an optional oven 450 to preheat the fibers to at least 50° C. or higher, up to about 100-200° C. to produce heated glass fibers/strip(s) 451, before entering the container 453.

The container 453 is optionally heated and contains a resin mixture comprising a mixture of any of the resins and catalysts or PI(s) disclosed in the above examples that will react in situ with the PI or catalyst on the surfaces of the glass fibers to initiate the polymerization of the resin mixture to form a TSFRC part or product. This resin mixture 455 can preferably be preheated prior to entering the container 453, and maintained at the entering temperature or further heated in the container 453 with a heating means to a temperature of at least about 50° C. and up to about 100 to about 200° C.

No detrimental amount of polymerization build-up will occur in the container 453 and resident monomer mixture 455 of the monomer because any polymerization that occurred in the container 453 in prior art processes will take place on the fibers in the rovings 440 and will be carried out of the container 453 with fully coated fiber strands 459. This resultant very low viscosity heated monomer mixture 455A will rapidly impregnate the strands/strip(s) 446 or heated strands/strip(s) 451 and coat the fibers in the strands/strip(s) 446 with the monomer mixture 455 to form partially coated fibers 456 that can be pulled against one or more rods 457 in the container of monomer mixture 455 to spread out the partially coated glass fibers 456 in the strands 446 or 451 and to produce fully coated fibers in the fiber strands/strip(s) 459.

The fully coated fiber strands/strip(s) 459 are then pulled out of the heated monomer mixture 455 by pulling them over a rod 460 after which they are pulled onto the rotating mandrel or form 462, preferably heated to a temperature in the range of about 150 to about 190° C. with any suitable heaters 465. The rotating mandrel or form 462 is supported and driven by driven rotating supports 464, one of such supports 464 connected to each end of the mandrel or form 462 at its horizontal axis. Rapid polymerization can begin as soon as the heated and fully coated fiber strands/strip(s) 459 contact a rotating heated mandrel or form 462, or previously laid down material 466 heated by the heated mandrel or form 462. Alternatively, or in addition, when formation of the desired shape is completed, the entire mandrel or form 462 and/or formed product can be removed from the supports 464, or from the mandrel or form 462 and placed in a hot oven to complete the polymerization to a point where at least 490 percent of the monomer has been polymerized. Completion of the polymerization normally requires about 4 to about 10 minutes at the above described rapid polymerization temperature range. Instead of, or in addition to, internal heaters for heating the mandrel or form 462, one or more external heaters 465, such as convection heaters, radiation heater(s), IR heaters, can be spaced from portions, or most of, the mandrel or form 462 and the interim product 466. In the above-described system, all of the elements 442 through 460 normally shuttle back and forth along the length of the mandrel or form 462 at a desired speed to produce a desired pattern of fiber strands/strip(s) in the formed TSFRC part or product.

Using these methods, very large, continuous glass fiber reinforced thermoplastic pipes, tanks, or other hollow shapes can be rapidly made at a relatively low cost and superior quality and performance compared to previous methods for forming reinforced polymer parts or products made by filament winding.

In some embodiments of the invention, the resultant products can also contain one or more pigments, fillers, and other additives by including such in the monomer mixtures. In addition to normal size parts made by existing methods for making reinforced thermoplastic composites, very large parts and/or products can be made, such as large body parts, floor pans and high-end thermoplastic composites for applications including wind turbine blades, aircraft parts, automotive parts, pipe and reinforced pressure vessels, tanks, etc.

Advantages of the present methods and systems may include substantially lower molding temperatures compared to the molding of molten thermoplastic polymers/copolymers, and the substantially lower equipment and operating costs resulting from these methods. Also, different embodiments employing the present concepts and teachings will be apparent and obvious to those of ordinary skill in this art and these embodiments are likewise intended to be within the scope of the claims. The inventor does not intend to abandon any disclosed inventions that are reasonably disclosed but do not appear to be literally claimed below, but rather intends those embodiments to be included in the broad claims either literally or as equivalents to the embodiments that are literally included.

What is claimed is:

1. A method of activating a glass fiber or flake to participate in polymerizing a resin, the method comprising:
    sizing the glass fiber or flake with a sizing composition comprising a solution containing a polymerization initiator, wherein the glass fiber or flake have not been pre-treated with a silane compound, and wherein sizing the glass fiber or flake comprises:
    physically bonding the polymerization initiator with a film former onto the glass fiber or flake, wherein the polymerization initiator is a peroxide; and
    activating the polymerization initiator by forming a free radical moiety on the polymerization initiator that can initiate polymerizing the resin, wherein:
        the free radical moiety on the polymerization initiator that can initiate polymerizing the resin comprises a peroxide radical,
        the sizing composition does not comprise the resin, and
        the polymerization initiator does not comprise a silane.

2. The method of claim 1, wherein:
    the polymerization initiator comprises a peroxide group; and
    activating the polymerization initiator by forming a free radical moiety on the polymerization initiator that can initiate polymerizing the resin comprises the peroxide group undergoing homolytic cleavage to form the peroxide radical.

3. The method of claim 1, wherein the polymerization initiator is a peroxide compound selected from the group consisting of organic peroxides, inorganic peroxides, peroxy-acid esters, hydroperoxides, ketone peroxides, cumene hydroperoxide, and dibenzoyl peroxide.

4. The method of claim 1, wherein the sizing composition further contains a catalyst for catalyzing one or more polymerization reactions in the resin.

5. The method of claim 4, wherein the catalyst comprises a metal salt of a carboxylic acid or a metal carbonyl.

6. The method of claim 5, wherein the metal salt of a carboxylic acid comprises cobalt naphthenate.

7. The method of claim 1, wherein the sizing composition does not comprise a compound that is capable of being polymerized by the polymerization initiator.

8. The method of claim 1, wherein physically bonding the polymerization initiator to the glass fiber or flake comprises physically bonding the polymerization initiator to a surface of the glass fiber or flake with a film former.

9. The method of claim 1, wherein the film former comprises N-vinyl amide polymers prepared from a cyclic monomer.

10. The method of claim 1, wherein the film former is present in the sizing composition in an amount from between about 0.1 weight percent and about 15 weight percent on a total solids basis.

11. The method of claim 1, wherein the polymerization initiator is an MEK peroxide.

12. A method of making a glass reinforced composite, the method comprising:
    sizing glass fibers or flakes with a sizing composition comprising a solution containing a polymerization initiator, wherein the glass fiber or flakes have not been pre-treated with a silane compound, and, wherein:
        sizing the glass fibers or flakes comprises physically bonding the polymerization initiator with a film former onto the glass fibers or flakes, and
        the polymerization initiator does not comprise a silane;
    forming a free radical moiety on the polymerization initiator to make activated glass fibers or flakes; and
    contacting the activated glass fibers or flakes with a polymer resin, wherein the activated glass fibers or flakes initiate polymerizing the resin around the glass fibers or flakes to form the glass reinforced composite.

13. The method of claim 12, wherein the polymer resin comprises a monomeric precursor of a polymer selected from the group consisting of a polyester, a polyvinyl polymer, a polyamide, and a polyacrylate.

14. The method of claim 12, wherein the method further comprises:
   wrapping the glass fibers coated with the resin around a mandrel;
   heating the coated glass fibers wrapped around the mandrel to further polymerize the resin between the glass fibers; and
   separating the glass reinforced composite from the mandrel, wherein at least a portion of the glass reinforced composite has a cylindrical shape.

15. The method of claim 14, wherein the cylindrically shaped glass reinforced composite comprises a pipe.

16. The method of claim 14, wherein the coated glass fibers wrapped around the mandrel are heated by the mandrel or an external heater positioned proximate to the mandrel.

17. The method of claim 12, wherein the activated glass fibers are collected on a perforated platform and the activated glass fibers are contacted with the polymer resin on the perforated platform to form a fiber reinforced glass mat as the glass reinforced composite.

18. The method of claim 12, wherein the polymerization initiator is a compound selected from the group consisting of azonitriles, azo-derivatives, alkyl peroxides, acyl peroxides, hydroperoxides, ketone peroxides, peresters, peracids, peroxy carbonates, peroxy carbamates, and persulfates.

19. The method of claim 12, wherein the polymer resin comprises a catalyst.

* * * * *